United States Patent [19]

McKinley

[11] 4,373,927
[45] Feb. 15, 1983

[54] TWO SPEED TRANSMISSION

[75] Inventor: John T. McKinley, Anderson, S.C.

[73] Assignee: Foundry & Steel, Inc., Anderson, S.C.

[21] Appl. No.: 181,137

[22] Filed: Aug. 25, 1980

[51] Int. Cl.³ .............................................. F16H 9/00
[52] U.S. Cl. ........................................ 474/74; 474/84
[58] Field of Search ............................. 474/73, 74, 84

[56] References Cited

U.S. PATENT DOCUMENTS 1,983,827 12/1934 Winther et al. .................. 474/74 X
3,429,192 2/1969 Allen ................................ 474/73 X
3,929,038 12/1975 Moser ............................. 474/74 X Primary Examiner—Kenneth Downey
Attorney, Agent, or Firm—Julian W. Dority

[57] ABSTRACT

A two-speed transmission having an input shaft and an output shaft. A slow speed input pulley and a high speed input pulley are provided on the input shaft. An overrunning clutch and a selectively engageable clutch are provided on the output shaft, each of which has a pulley provided thereon. A pair of timing belts, each of which has teeth on both sides thereof, pass around the pulleys provided on the input shaft and the pulleys provided on the output shaft causing the output shaft to rotate at an opposite direction from the input shaft. By selectively engaging and disengaging the selectively engageable clutch, the output shaft can be rotated at two distinct speeds and at the high speed, it overruns the drive mechanism for the slow speed stage as a result of the use of the overrunning clutch.

3 Claims, 5 Drawing Figures

TWO SPEED TRANSMISSION

BACKGROUND OF THE INVENTION

Heretofore, two-speed transmissions have normally incorporated gears running in oil baths. One problem with such devices is that the gears make a substantial amount of noise and must be lubricated continuously to minimize wear. While these type of transmissions may be satisfactory for certain purposes, when a large number of such devices are utilized in an area, they produce very undesirable conditions.

SUMMARY OF THE INVENTION

The two-speed transmission constructed in accordance with the present invention includes an input shaft which has a slow speed input pulley and a high speed input pulley mounted thereon. An overriding clutch and a selectively engageable clutch are mounted on an output shaft. Pulleys are, in turn, connected to the output shaft through the overrunning clutch and the selectively engageable clutch.

First and second timing belts having teeth on both the inner and outer surfaces thereof extend around respective pulleys with one of the timing belts extending around the slow speed input pulley and a first idle pulley so that the teeth on the inner surface thereof mesh with teeth provided on these pulleys. The teeth on the outer surface of the timing belt are in driving engagement with the low speed output pulley.

The other timing belt extends around the high speed input pulley and the other idle pulley with the teeth on the inner surfaces thereof engaging the teeth provided on the pulleys. The teeth on the outer surface of the other timing belt mesh with teeth provided on the output pulley.

As a result, the output shaft of the two-speed transmission is driven in the opposite direction from the input shaft and can be selectively changed from a slow speed to a high speed by merely engaging the selectively engaging clutch.

It is to be understood that while reference is being made throughout this specification and claims to high and slow speeds, the terms high and slow are used for the purpose of describing that one speed is greater than the other.

Accordingly, it is an important object of the present invention to provide a simple and reliable two-speed transmission.

Another important object of the present invention is to provide a two-speed transmission which operates with a minimum of noise and utilizes a pair of timing belts that are maintained in driving relation with the input and output shafts of the two-speed transmission.

The construction designed to carry out the invention will be hereinafter described together with other features thereof.

The invention will be more readily understood from a reading of the following specification forming a part thereof, wherein an example of the invention is shown and wherein:

DESCRIPTION OF A PREFERRED EMBODIMENT

Figure 1:
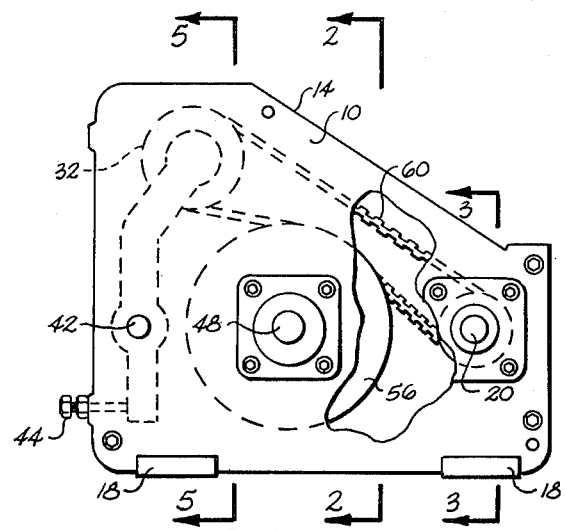
FIG. 1 is a side elevational view illustrating a two-speed transmission constructed in accordance with the present invention.

Referring in more detail to FIG. 1 of the drawings, there is illustrated a two-speed transmission constructed in accordance with the present invention which includes a housing having side plates 10 and 12 that are joined by top and bottom plates 14 and 16. Legs 18 are provided on the bottom through which bolts (not shown) pass for securing the transmission to any suitable support.

An input shaft 20 is journaled in bearing blocks 22 and 24 carried within the side walls 10 and 12, respectively. The input shaft, when in operation, may be driven by any suitable device such as an electric motor.

Positioned on the input shaft is a slow speed pulley 26 that is secured to the shaft by any suitable means such as by means of a key. Also positioned on the input shaft is a high speed pulley 28 which is of a larger diameter than the slow speed pulley 26. The high-speed pulley 28 is also fixed to the shaft 20. There is provided a pair of idle rollers 30 and 32 that are, in turn, mounted on pivotal arms 34 and 36, respectively. The idle rollers 30 and 32 are supported adjacent the ends of the pivotal arms 34 and 36 on bearings so as to permit them to rotate freely.

The pivotal arms, in turn, have hubs 38 and 40 through which a shaft 42 extends for permitting the arms to be pivoted thereon. An adjusting screw 44 extends through the rear 46 of the housing and engages a bottom portion of the pivotal arm 36 so that by screwing the adjusting screw 44 in or out, the location of the idle rollers can be varied. Both of the pivotal arms are provided with adjusting screws.

An output shaft 48 is journaled between the side walls 10 and 12 on bearings 50 and has a portion that extends laterally beyond the side wall 10 to which any suitable power takeoff can be attached.

Positioned on the output shaft 48 is a conventional overrunning clutch 52. One suitable overrunning clutch is manufactured by Dana Corp., Industrial Power Transmission Div., 23601 Hoover Rd., Warren, Michigan, Model FSO-400/.750GR.

Also provided on the output shaft is an electro clutch 53 that upon being activated by any suitable means such as a voltage causes engagement with shaft 48. It is to be understood that any suitable electromechanical clutch could be utilized or any suitable selectively mechanical clutch could be used. One suitable electroclutch is manufactured by Electroid Co., 95 Progress St., Union, N.J., Model SEC-42C-16, Style #1.

Positioned on the overrunning clutch 52 is a pulley 54 which is referred to as the slow speed pulley. Positioned on the selectively operated clutch 53 is another pulley 56 which is referred to as the high speed pulley.

Figure 2:
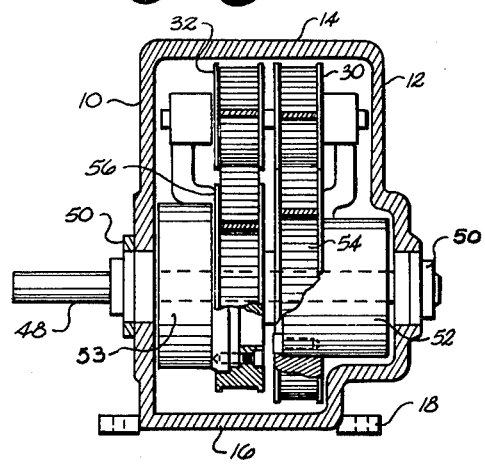
FIG. 2 is a sectional view taken along line 2—2 of FIG. 1.
Figure 3:
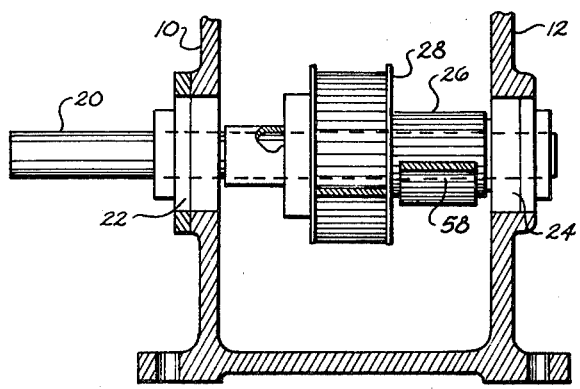
FIG. 3 is a sectional view taken along line 3—3 of FIG. 1.
Figure 4:
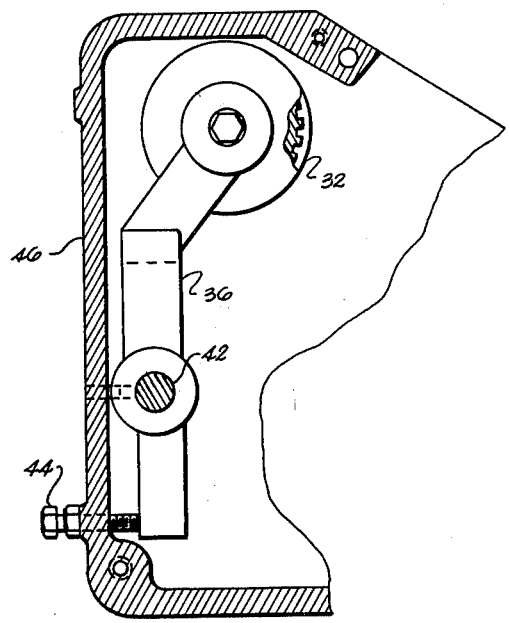
FIG. 4 is an enlarged side elevational view illustrating an idle roller.
Figure 5:
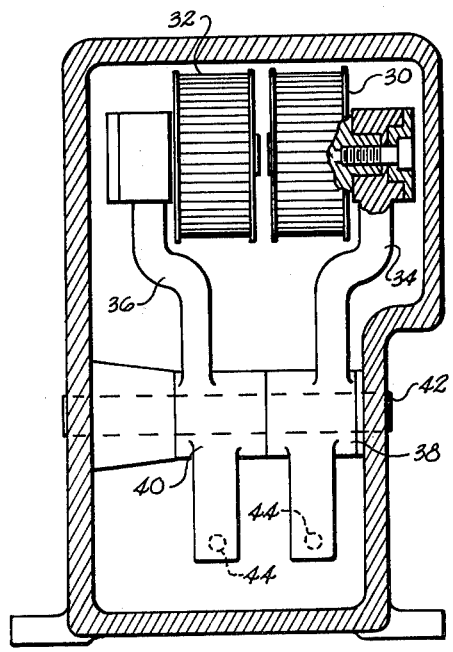
FIG. 5 is a sectional view taken along line 5—5 of FIG. 1.

A timing belt 58, which has teeth provided on both the inner and outer surfaces thereof, passes around the slow speed pulley 26 provided on the input shaft 20 and the idle roller 30 with the teeth provided on the inner surface engaging teeth provided on the pulleys. The belt then passes over the slow speed output pulley 54 as best seen in FIG. 2 so that the teeth on the outer surface thereof engage the teeth provided on the output pulley producing a driving relation between the input pulley 26 and the output pulley 54. A similar timing belt 60 extends around the high speed input pulley 28, idle roll 32 with the inner teeth engaging the teeth provided thereon and the teeth provided on the outer surface of the timing belt 60 engaging the teeth provided on the pulley 56.

As a result of providing teeth on both the inner and outer surfaces of the timing belts 58 and 60 and the positioning of the belts, the output shaft 48 is rotated in the opposite direction from the input shaft 20 as shown by the arrows in FIG. 1.

In operation, after the adjusting screws 44 have been adjusted to maintain the proper tension in the belts 58 and 60, the input shaft 20 is coupled to any suitable drive such as an electric motor. As the input shaft begins to rotate, the output drive shaft is driven through the belt 58 extending around the pulleys 26 and 54 provided on the input and output shafts. As long as the input shaft is rotated at a constant speed, the output shaft 48 is rotated in the opposite direction at a constant speed as a result of being driven by the belt 58, pulleys 26 and 54 through the overunning clutch 52. This speed is referred to as the slow speed setting for the two-speed transmission. If it is desired that the output shaft 48 be rotated at the other higher predetermined speed, then the electro-clutch 53 is engaged. The electroclutch 53 may be activated by any suitable source of power and upon being engaged, the pulley 56 becomes coupled to the output shaft 48. As a result of the input pulley 28 being larger than the slow speed pulley 26 provided on the output shaft, the output shaft is driven at a higher speed with a minimum of drag imparted from the slow speed pulleys and drive belt 58 as a result of the fact that the slow speed pulley 54 is mounted on an overrunning clutch.

While throughout this application the transmission has been referred to as a two-speed transmission, it is to be understood, of course, that if while the transmission is operated in either one of the other stages, the input shaft speed is varied, you can vary the speeds within these two different stages.

While a preferred embodiment of the invention has been described using specific terms, such description is for illustrative purposes only, and it is to be understood that changes and variations may be made without departing from the spirit or scope of the following claims.

What is claimed is:
1. A two-speed transmission comprising:
an input shaft,
a slow speed input pulley carried on and being fixed to said input shaft,
a high speed input pulley having a diameter greater than said slow speed pulley carried on and being fixed to said input shaft,
an output shaft,
an overrunning clutch carried on said output shaft;
a slow speed output pulley carried by said overrunning clutch,
a selectively engageable clutch carried on said output shaft,
a high speed output pulley carried by said selectively engageable clutch having a smaller diameter than said slow speed pulley carried by said overrunning clutch,
first and second idle pulleys,
said first timing belt extending around said slow speed input pulley and said first idle pulley with said teeth on said inner surface engaging said slow speed input pulley and said idle pulley, and said teeth on said outer surface being in driving engagement with said low speed output pulley,
said second timing belt extending around said high speed input pulley and said second idle pulley with said teeth on an inner surface engaging said high speed input pulley and said idle pulley and said teeth on said outer surface being in driving engagement with said high speed output pulley,
a pair of pivotal arms;
each of said idle rolls being supported adjacent an end of a respective pivotal arm, and
adjustable means associated with said pivotal arms for tensioning said timing belts and maintaining the run of said belts substantially linear,
whereby when said input shaft is rotated at a constant speed, said output shaft can be selectively driven in an opposite direction at two distinct speeds either engaging or disengaging said selectively engageable clutch.

2. The two speed transmission as set forth in claim 1 further comprising:
teeth provided on said input and output pulleys meshing with said teeth on said belts.

3. The two-speed transmission as set forth in claim 1 further comprising:
said selectively engageable clutch being electrically operated.

* * * * *